US008412371B2

(12) United States Patent
Komatsu

(10) Patent No.: US 8,412,371 B2
(45) Date of Patent: Apr. 2, 2013

(54) LASER WELDING SYSTEM, LASER WELDING METHOD, AND EMITTING DEVICE

(75) Inventor: Gakushi Komatsu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 1565 days.

(21) Appl. No.: 11/514,978

(22) Filed: Sep. 5, 2006

(65) Prior Publication Data

US 2007/0075055 A1   Apr. 5, 2007

(30) Foreign Application Priority Data

Sep. 30, 2005   (JP) ................................ 2005-289164

(51) Int. Cl.
*G06F 19/00*   (2011.01)
*B23K 26/20*   (2006.01)
*B23K 26/08*   (2006.01)

(52) U.S. Cl. .............. 700/166; 219/121.63; 219/121.78; 700/245; 700/250; 700/253

(58) Field of Classification Search .......... 219/121.61–121.64, 121.78, 121.79, 219/121.81, 121.83; 700/245, 250, 166, 700/253; 318/568.11
See application file for complete search history.

(56) References Cited

U.S. PATENT DOCUMENTS

| | | | |
|---|---|---|---|
| 4,825,036 A | 4/1989 | Bickel et al. | |
| 4,907,169 A | 3/1990 | Lovoi | |
| 5,536,916 A * | 7/1996 | Kohari et al. | 219/121.83 |
| 6,153,853 A | 11/2000 | Maruyama et al. | |
| 6,640,682 B2 * | 11/2003 | Wagner et al. | 83/289 |
| 7,130,718 B2 * | 10/2006 | Gunnarsson et al. | 700/254 |
| 7,149,602 B2 * | 12/2006 | Watanabe et al. | 700/245 |
| 8,036,776 B2 * | 10/2011 | Hellberg et al. | 700/261 |
| 8,103,381 B2 * | 1/2012 | Fukawa | 700/245 |
| 2005/0107918 A1 * | 5/2005 | Watanabe et al. | 700/245 |
| 2005/0155803 A1 | 7/2005 | Schiele | |

FOREIGN PATENT DOCUMENTS

| | | |
|---|---|---|
| JP | 2000-255285 A | 9/2000 |
| JP | 2001340979 A * | 12/2001 |
| JP | 2004-216418 | 8/2004 |
| JP | 2005-108144 A | 4/2005 |
| JP | 2005-177862 | 7/2005 |

OTHER PUBLICATIONS

Japanese Office Action of corresponding Japanese Application No. 2005-289164, dated Nov. 16, 2010 and English translation.

* cited by examiner

*Primary Examiner* — Samuel M Heinrich
(74) *Attorney, Agent, or Firm* — Global IP Counselors, LLP

(57) ABSTRACT

A laser welding system includes a robot control unit that acquires movement amount measurement values from encoders provided on axes of the robot and calculates the current position of a laser processing head based on the measurement values. Based on the calculated current position of the laser processing head, the robot control unit calculates a laser beam emission direction specifying the direction in which the laser beam should be aimed in order to strike a predetermined laser irradiation position. The robot control unit sends a command indicative of the laser beam emission direction to a processing head control unit which changes the direction of a reflecting mirror provided inside the laser processing head such that the laser beam is emitted in the specified direction.

7 Claims, 12 Drawing Sheets

LASER WELDING SYSTEM, LASER WELDING METHOD, AND EMITTING DEVICE

CROSS-REFERENCE TO RELATED APPLICATIONS

This application claims priority under 35 U.S.C. §119 to Japanese Patent Application No. 2005-289164. The entire disclosure of Japanese Patent Application No. 2005-289164 is hereby incorporated herein by reference.

BACKGROUND OF THE INVENTION

1. Field of the Invention

The present invention generally relates to a laser welding system, a laser welding method, and an emitting device.

2. Background Information

Conventionally, certain types of welding have been conducted using robots. In recent years, laser welding is also being conducted using robots. Japanese Laid-Open Patent Publication No. 2005-177862 discloses an example of a conventional laser welding technology which includes a laser processing head that is mounted to an end of a robot arm and configured to emit a laser beam. By changing the position and posture (angle) of the robot, the laser processing head is moved to such positions that the laser beam reaches the points where welding is to be executed. Thus, laser welding is accomplished by directing the laser beam onto the targeted welding point from a position remote from the workpiece. Such conventional technology is contrived such that the laser can be directed onto the welding point from a position located at a fixed prescribed distance from the workpiece. As a result, the workpiece can be successively welded at a plurality of welding points by changing the position and posture of the robot to move the laser processing head to appropriate positions.

In view of the above, it will be apparent to those skilled in the art from this disclosure that there exists a need for an improved laser welding system, laser welding method and emitting device. This invention addresses this need in the art as well as other needs, which will become apparent to those skilled in the art from this disclosure.

BRIEF SUMMARY OF THE INVENTION

In the conventional laser welding system using the robot, the current position where the robot is actually moving is sometimes different from a movement position specified in a control command. Due to such factors as inertia resulting from the mass of the laser processing head mounted to the end of the robot arm and the smoothness or ease of movement of the robot, the robot sometimes arrives at a commanded movement position slightly late and/or does not accurately follow the commanded positions (i.e., movement positions specified in control commands). Consequently, in the conventional laser welding system, the discrepancy between the actual current position and the commanded position of the robot sometimes causes the laser beam to be directed onto a position other than the specified laser irradiation position (i.e., the position specified in the design specifications as a welding point).

Accordingly, one object of the present invention is to provide a laser welding system and a laser welding method that is capable of accurately positioning the laser beam onto a predetermined laser irradiation position even when the actual position and/or posture (angle) of a robot is different from the position and/or posture stipulated in a robot movement control command.

In order to achieve the aforementioned object, a laser welding system is basically provided that comprises a robot, a laser beam emitting section, a measuring section and a control unit. The robot is configured and arranged to move in accordance with predetermined movement data. The laser beam emitting section is mounted to the robot and configured and arranged to emit a laser beam. The measuring section is configured and arranged to measure a current movement position of the robot with respect to a movement position specified in the predetermined movement data. The control unit is configured to adjust a laser emission direction in which the laser beam is emitted from the laser beam emitting section based on the current movement position of the robot measured by the measuring section such that the laser beam strikes a predetermined irradiation position.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
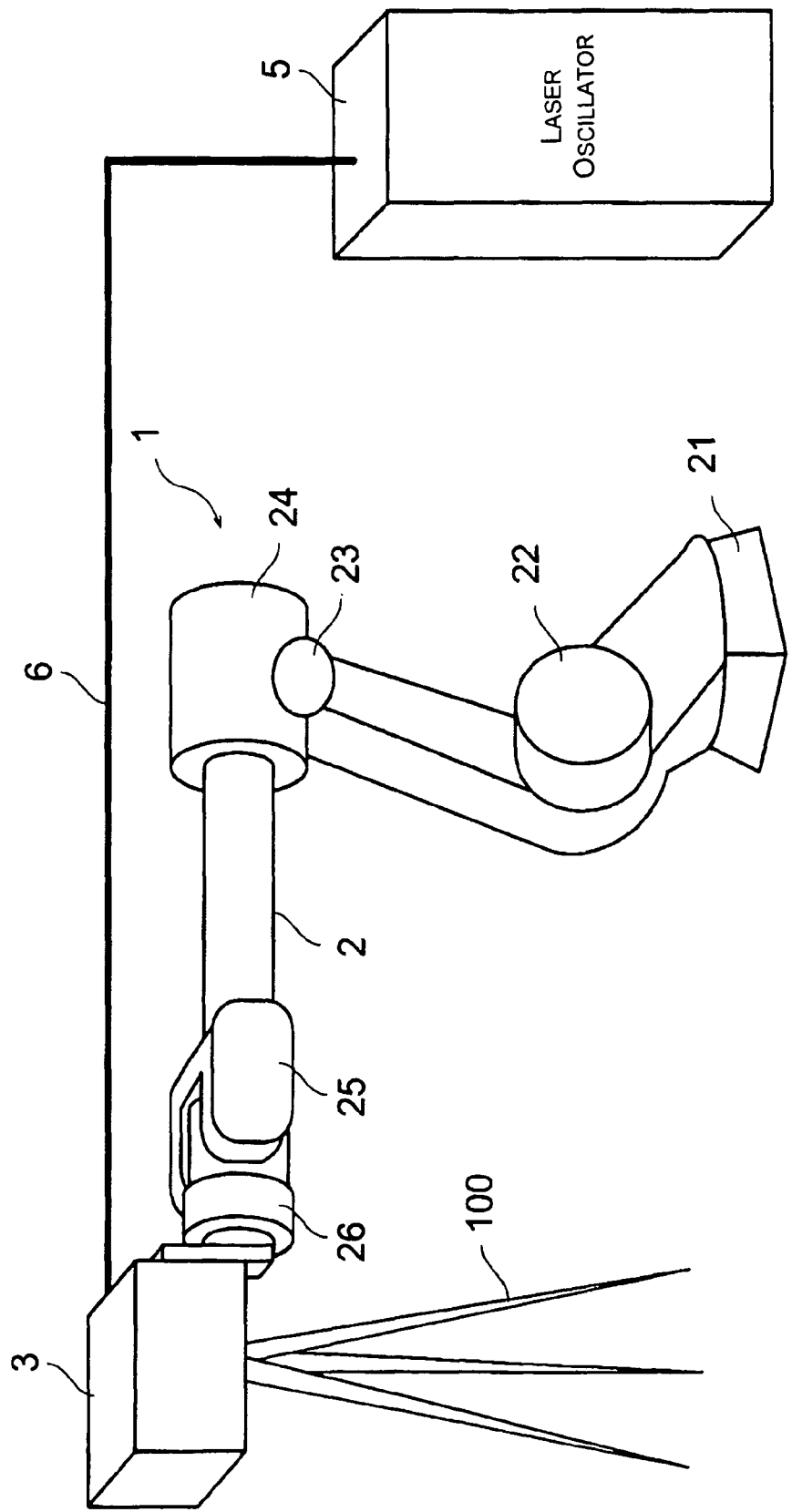
FIG. 1 is a perspective schematic view of a laser welding system in accordance with a first embodiment of the present invention.
Figure 2:
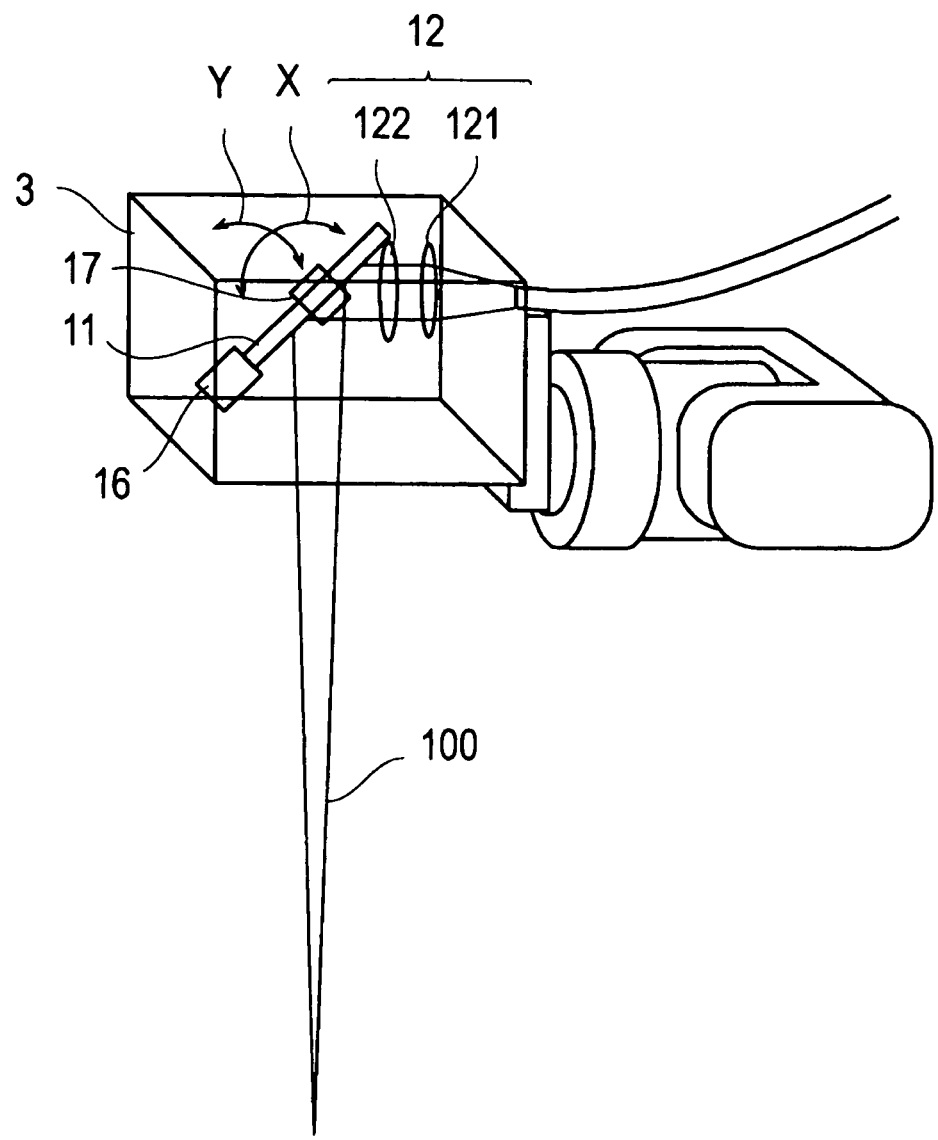
FIG. 2 is a schematic perspective view of a laser processing head of the laser welding system illustrating components disposed therein in accordance with the first embodiment of the present invention.
Figure 3:
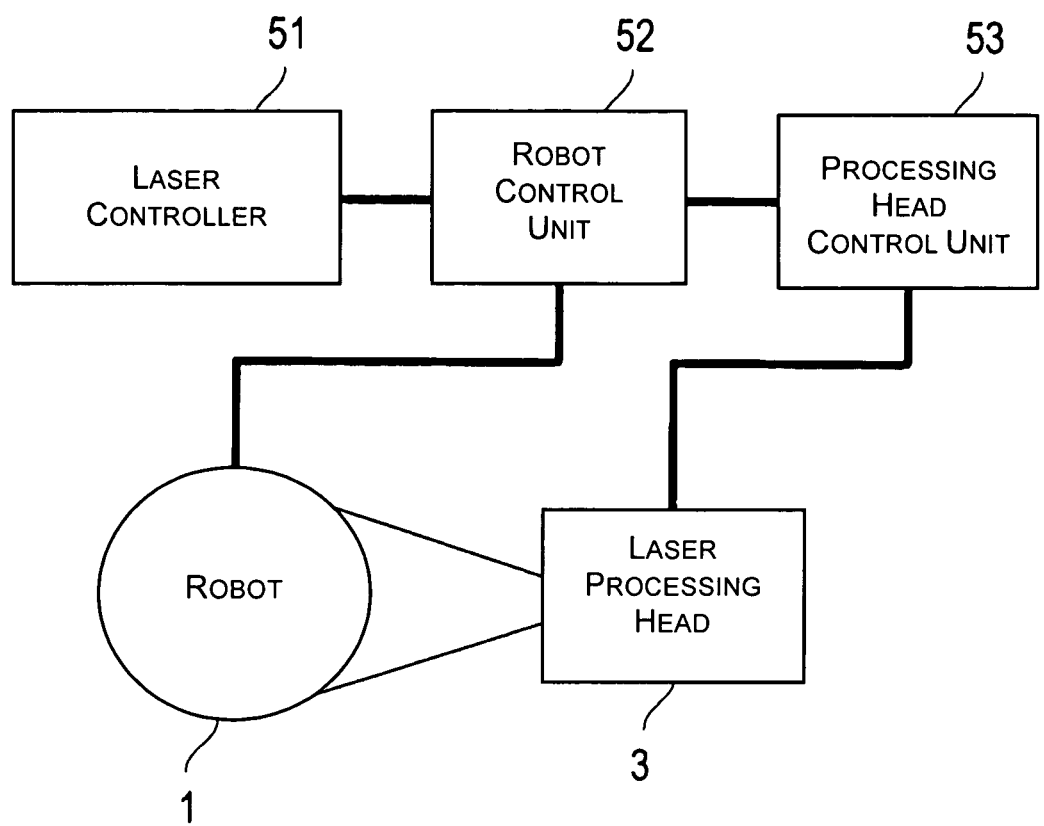
FIG. 3 is a block diagram for explaining an overall control scheme of the laser welding system in accordance with the first embodiment of the present invention.

FIG. 1 is a schematic perspective view of a laser welding system in accordance with the first embodiment of the present invention. FIG. 2 is a schematic perspective view of a laser processing head 3 illustrating components therein. FIG. 3 is a block diagram for explaining an overall control scheme of the laser welding system in accordance with the first embodiment of the present invention.

Unlike conventional spot welding and other types of welding in which a welding jig is in direct contact with the workpiece, welding conducted using the laser welding system in the present invention is accomplished with a laser beam emitted from laser processing head 3 that is remote from a workpiece. This type of welding is thus called "remote welding."

As seen in FIG. 1, the laser welding system of the present invention includes a robot 1 (moving device), the laser processing head 3 (laser beam emitting section), a laser oscillator 5, and an optical fiber cable 6. The laser processing head 3 is mounted to a tip end of an arm 2 of the robot 1 and configured and arranged to emit a laser beam 100. The laser oscillator 5 serves as a laser light source. The optical fiber cable 6 is configured and arranged to carry the laser light from the laser oscillator 5 to the laser processing head 3. A YAG laser oscillator is preferably used as the laser oscillator 5 so that the laser light can be carried by the optical fiber cable 6.

The robot 1 is preferably a so-called multiple-axis robot (also called "multi-jointed robot"). More specifically, in this embodiment, the robot 1 preferably has six movable axes 21 to 26 as shown in FIG. 1.

Movement route data is obtained by teaching the robot 1, and the robot 1 is moved along the movement route by control commands specifying the movement amount of each of the axes 21 to 26. As a result, the tip end of the arm 2, i.e., the laser processing head 3, can be moved in various directions by changing the position and posture of the robot 1.

A motor and an encoder (not shown in FIG. 1) are mounted to each of the axes 21 to 26 of the robot 1. The motors are, for example, servomotors configured and arranged to rotate by an amount corresponding to the movement amount specified in a command issued from a robot control unit 52 (described in more detail below with reference to FIGS. 3 and 4). The encoders are, for example, pulse encoders that serve as measuring devices. Each pulse encoder is configured and arranged to output a number of pulses corresponding to the amount by which the respective one of the axes 21 to 26 moves. The pulse signals outputted from the pulse encoders are fed to the robot control unit 52. Needless to say, the motors and the encoders used in the invention are not limited to these specific devices and it is also possible to use devices other than servomotors and pulse encoders.

It is preferable for the laser processing head 3 to be mounted to the robot arm 2 with, for example, a vibration suppressing member configured and arranged to absorb vibrations disposed therebetween in order to prevent vibrations from being transferred from the robot arm 2 to the laser processing head 3. The vibration suppressing member can be a vibration suppressing (damping) steel plate, a damper, a vibration suppressing rubber member, or the like. It is preferable that the vibration suppressing member be highly effective at absorbing vibrations at the natural frequencies that are imparted to the laser processing head 3. However, it is also acceptable to mount the laser processing head 3 to the end of the robot arm 2 directly using a joint mechanism and omit the vibration suppressing member.

As shown in FIG. 2, the laser processing head 3 has a reflecting mirror 11 (emission direction changing section), a pair of motors 16 and 17 (drive section) and a lens set 12. The reflecting mirror 11 is configured and arranged to redirect (e.g., reflect and/or refract) the laser beam 100 carried by the optical fiber cable 6 toward a target position. The motors 16 and 17 are configured and arranged to turn the reflecting mirror I 1. The lens set 12 is configured and arranged to adjust a focal distance of the laser beam 100 (i.e., a distance from the reflecting mirror 11 to a focal point of the laser beam 100).

The reflecting mirror 11 is arranged such that it can be turned about an X axis and a Y axis independently with the X and Y axes being defined as axes perpendicular to a Z axis that is perpendicular to a plane (main surface) of the reflecting mirror 11. As a result, the direction of laser beam 100 can be adjusted freely by turning the reflecting mirror 11 about the X and Y axes. The motors 16 and 17 are provided to turn the reflecting mirror 11. If necessary, the motors 16 and 17 can be provided with a conventional gear mechanism (not shown).

The motors 16 and 17 are configured to turn the reflecting mirror 11 based on a signal sent from a processing head control unit 53 (discussed in more detail below with reference to FIGS. 3 and 4) in response to a command from the robot control unit 52, thereby changing a laser emission direction in which the laser beam 100 is emitted. The motors 16 and 17 are preferably conventional motors that can be rotated through a specified angular distance in response to a command (instruction), e.g., a servomotor or a stepping motor.

As seen in FIG. 2, the lens set 12 includes a collimating lens 121 and a movable focusing lens 122. The collimating lens 121 is configured and arranged to change a laser light emitted from the end of the optical fiber cable 6 to a collimated laser beam. The focusing lens 122 is configured and arranged to focus the collimated laser beam such that the collimated laser beam can be moved so as to change the focal distance thereof, thereby enabling the laser beam 100 to be focused at any desired position.

The focusing lens 122 is moved, i.e., the focal distance is adjusted, based on a signal sent from the processing head control unit 53 in response to a command from the robot control unit 52. Although adjusting the focal distance enables the laser beam 100 to be focused freely at any desired position, there is a limit to the range of distances at which the laser beam 100 can be focused because the range within which the focal distance can be adjusted is restricted by the characteristics of the focusing lens 122 used and by the range through which the focusing lens 122 can be moved.

As mentioned above, the laser oscillator 5 is preferably a YAG laser oscillator. A YAG laser is used so that the laser light can be carried by the optical fiber cable 6. However, there are other types of conventional lasers that can be used for laser welding, and any type of conventional laser is acceptable so long as the emitted laser light can be carried by the optical fiber cable 6.

Referring now to FIG. 3, the control scheme of the laser welding system will now be explained in accordance with the first embodiment of the present invention.

As shown in FIG. 3, the control scheme of the laser welding system includes a laser controller 51, the robot control unit 52 and the processing head control unit 53. The laser controller 51 is configured to control the on-off status and the output value of the laser output from the laser oscillator 5. The robot control unit 52 is configured to control the movements of the robot I and the laser welding system as a whole. The processing head control unit 53 is configured to control the movements of the reflecting mirror 11 and the focusing lens 122 of the laser processing head 3.

The laser controller 51 is configured to turn the laser output of the laser oscillator 5 on and off and to adjust the output strength (intensity) of the laser light from the laser oscillator 5. The laser controller 51 is configured to turn the laser output on and off and to adjust the output intensity of the laser based on commands, i.e., control signals, issued from the robot control unit 52.

Based on predetermined movement data obtained in advance by teaching (called "teaching data"), the robot control unit 52 is configured to control the movements of the robot 1, the on-off status of the laser emitted from the laser processing head 3, the output intensity of the laser emitted from the laser processing head 3, and the various controllable aspects of the laser processing head 3. Thus, the robot control unit 52 is configured to control the movements of the robot 1, the output of the laser from the laser processing head 3, and the emission direction of the laser beam emitted from the laser processing head 3.

Figure 4:
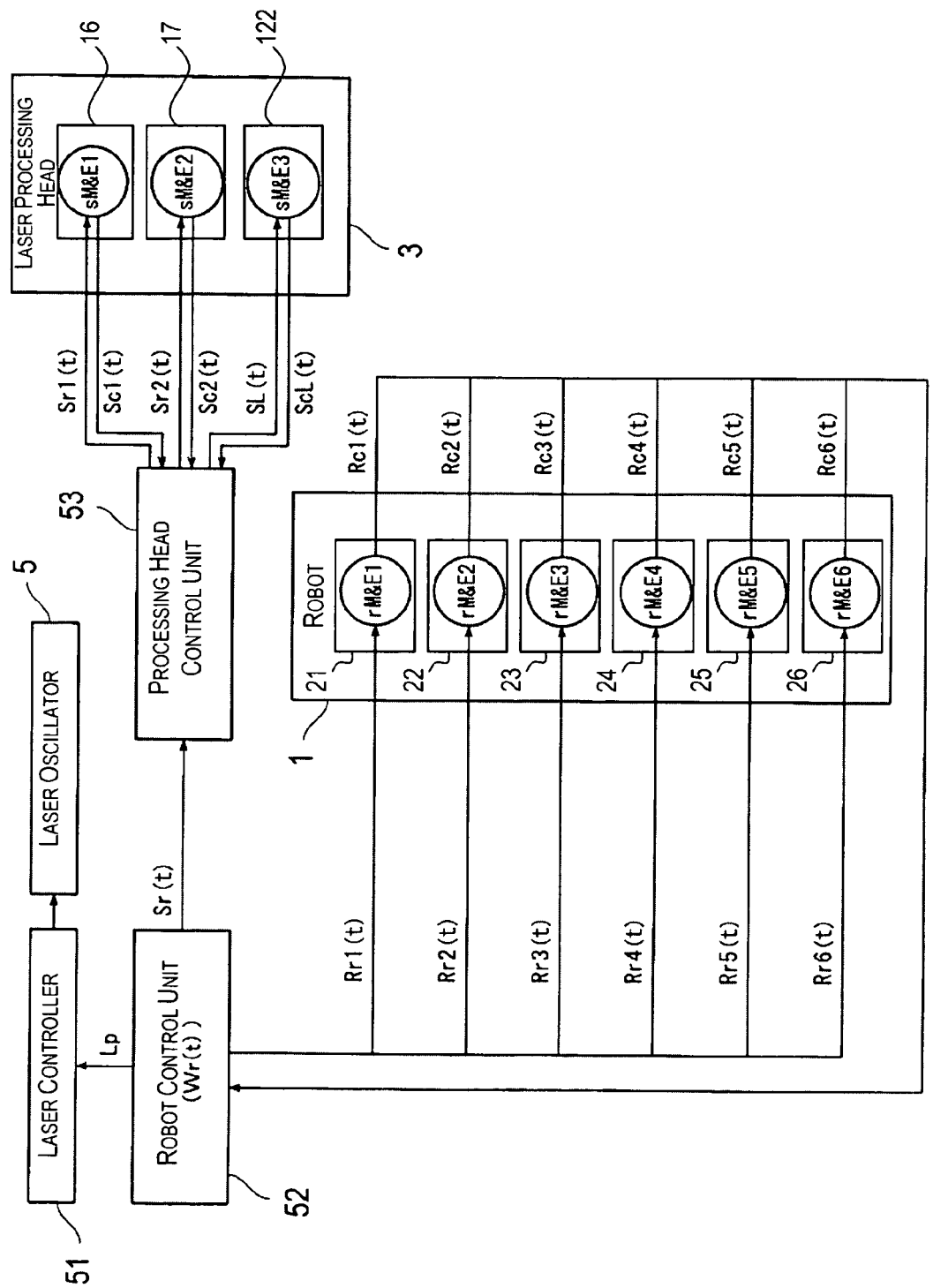
FIG. 4 is a block diagram for explaining a welding operation control executed in the laser welding system in accordance with the first embodiment of the present invention.

As mentioned previously, a motor and an encoder indicated as rM&E1 to rM&E6 in FIG. 4 are provided at each of the axes 21 to 26 of the robot 1, respectively. The robot control unit 52 is configured to send commands to the motors instructing them to move by certain amounts (movement amounts) and the motors move by the instructed movement amounts in response to the commands. When a motor has moved, the robot control unit 52 is configured to obtain the actual rotation amount from the encoder, through which the corresponding one of the axes 21 to 26 has moved.

The processing head control unit 53 is configured to freely change the laser emission direction of the laser beam by moving the reflecting mirror 11 by controlling the motors 16 and 17. The processing head control unit 53 is configured to move the reflecting mirror 11 based on a control signal from the robot control unit 52.

An encoder is provided on the rotary shaft of each of the motors 16 and 17 configured and arranged to rotate the reflecting mirror 11 inside the laser processing head 3 (the motors 16 and 17 and the encoders are indicated collectively as sM&E1 and sM&E2, respectively, in FIG. 4). A motor for driving the focusing lens 122 in order to adjust the focal distance of the laser beam and an encoder for measuring the movement amount of the motor are also provided inside the laser processing head 3 (the motor and encoder are indicated as sM&E3 in FIG. 4).

The processing head control unit 53 is configured to send commands to the motors 16 and 17 instructing them to move by certain amounts (movement amounts) based on the command signal from the robot control unit 52 and the motors 16 and 17 move by the instructed movement amounts in response to the commands. When the motors 16 and 17 have moved, the processing head control unit 53 is configured to obtain the actual rotation amount through which the motor shafts of the motors 16 and 17 have moved from the encoder. The signals from the encoders are processed inside the processing head control unit 53 to confirm whether or not the reflecting mirror 11 and the focusing lens 122 actually have been moved in accordance with the command values.

Thus, in a direct manner, the laser output is controlled by the laser controller 51 and the laser processing head 3 is controlled by the processing head control unit 53. However, substantively, the movements of the robot 1, the on-off operation of the laser, the adjustment of the laser output intensity, and the control of the laser emission direction are all controlled by control signals issued from the robot control unit 52. Therefore, the robot control unit 52 corresponds to the control unit of the laser welding system in accordance with the present invention.

The robot control unit 52 preferably includes a microcomputer with a laser welding operation control program that controls the robot I and the laser processing head 3 as discussed below. The robot control unit 52 can also include other conventional components such as an input interface circuit, an output interface circuit, and storage devices such as a ROM (Read Only Memory) device and a RAM (Random Access Memory) device. The microcomputer of the robot control unit 52 is programmed to control the robot 1 and the laser processing head 3. The memory circuit stores processing results and control programs such as ones for laser irradiation position control operations that are run by the processor circuit. The robot control unit 52 is operatively coupled to the robot 1, the laser processing head 3 and other components in a conventional manner. The internal RAM of the robot control unit 52 stores statuses of operational flags and various control data. The internal ROM of the robot control unit 52 stores the programs, map data, and the like for various operations. The robot control unit 52 is capable of selectively controlling any of the components of the laser welding system in accordance with the control program. It will be apparent to those skilled in the art from this disclosure that the precise structure and algorithms for the robot control unit 52 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The operation of the laser welding system will now be explained in accordance with the first embodiment of the present invention.

Figure 5:
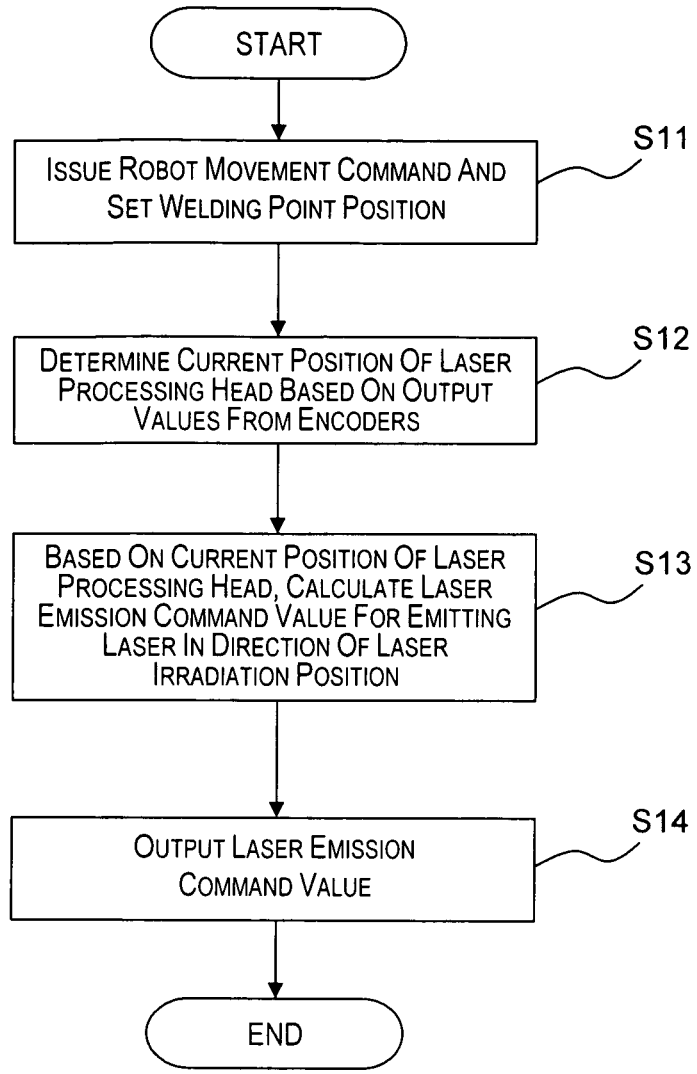
FIG. 5 is a flowchart illustrating a control flow for a laser irradiation position control executed in the laser welding system in accordance with the first embodiment of the present invention.

FIG. 4 is a block diagram for explaining a welding operation control executed in the laser welding system in accordance with the first embodiment. FIG. 5 is a flowchart showing the control steps for the laser irradiation position control of the welding operation control. In the first embodiment, operations (movements) based on these control steps illustrated in the flowchart of FIG. 5 are referred to collectively as "laser irradiation position control."

In step S11, in order to operate the robot 1 to move the laser processing head 3 to a prescribed position based on the teaching data, the robot control unit 52 is configured to issue commands specifying movement amounts $Rr1(t)$ to $Rr6(t)$ of the respective axes 21 to 26 of the robot 1 in accordance with the teaching data. At the same time, the robot control unit 52 is configured to set a welding point position $Wr(t)$ for determining the direction in which the reflecting mirror 11 inside the laser processing head 3 should be oriented in order to shine the laser beam toward the welding point based on the teaching data.

As a result of the control processing in step S11, the motor of each of the axes 21 to 26 of the robot 1 rotates in accordance with the respective movement command amounts Rr1(t) to Rr6(t) and the actual rotation amount Rc1(t) to Rc6(t) of each axis is fed back from the respective encoder.

In step S12, the robot control unit 52 is then configured to calculate the current position of the laser processing head 3 based on the encoder output values (measured rotation amounts Rc1(t) to Rc6(t) of the axes 21 to 26) obtained from the encoders.

In step S13, based on the current position of the laser processing head 3 calculated in step S12, the robot control unit 52 is configured to calculate a laser emission command value Sr(t) for moving the reflecting mirror 11 such that the laser beam is emitted in the direction of the scheduled laser irradiation position (i.e., predetermined welding point). Then, in step S14, the robot control unit 52 is configured to output the calculated laser emission command value Sr(t).

The processing head control unit 53 is configured to receive the laser emission command value Sr(t). In order to ensure that the laser beam is emitted in accordance with the laser emission command value Sr(t), the processing head control unit 53 is configured to calculate motor rotation amounts Sr1(t) and Sr2(t) for turning the reflecting mirror 11 and a lens movement command value SL(t) for adjusting the focal distance. The motor rotation amounts Sr1(t) and Sr2(t) are based on coordinate values in a coordinate system located inside the laser processing head 3 as explained in more detail below. The motors 16 and 17 are then operated based on the motor rotation amounts Sr1(t) and Sr2(t) and the focusing lens 122 is moved in accordance with the lens movement command value SL(t).

Accordingly, the laser emission command value Sr(t) is a command value for moving the reflecting mirror 11 and the focusing lens 122 in order to compensate for the deviation of the actual position of the robot 1 from the commanded position. In other words, the laser emission command value Sr(t) is a revised command value that has been revised with respect to the position specified in the teaching data based on the actual position of the laser processing head 3. The laser emission command value Sr(t) is calculated using a coordinate conversion. The method of calculating the laser emission command value Sr(t) will now be explained.

This embodiment uses a robot coordinate system ΣR centered on a reference position of the robot 1 and a coordinate system ΣS(t) of the laser processing head 3 that corresponds to a command value sent to the robot 1. The position of the coordinate system ΣS(t) in the robot coordinate system ΣR changes with time as the robot 1 moves. The coordinate system of the laser processing head 3 corresponding to the current position of the laser processing head 3 is indicated as ΣS'(t), the current position of the laser processing head 3 (more specifically, the position of the center of the reflecting mirror 11) is indicated as Rcp(t), the current attitude (angle) of the laser processing head 3 is indicated as Rcθ(t), and a rotation matrix determined based on the current angle of the laser processing head 3 (more specifically, the current angle of the reflecting mirror 11) is indicated as $^{S}T_{R}(Rc\theta(t))$. Also, the welding point position Wr(t) is expressed as a coordinate value in the robot coordinate system ΣR and changes with time t.

The current position Rcp(t) of the laser processing head 3 is expressed as a coordinate value in the robot coordinate system ΣR and is determined based on the movement amounts of the axes 21 to 26 of the robot 1 acquired from the encoders.

The laser emission command value Sr(t) for moving the reflecting mirror 11 and the focusing lens 122 is calculated using the matrix equation (1) below. The equation (1) uses the actual position/attitude Rc(t) of the laser processing head 3 to convert the welding point position Wr(t) into a coordinate in the coordinate system ΣS'(t) of the laser processing head 3. As shown in the matrix equation (2) below, the position/attitude Rc(t) of the laser processing head 3 used in the equation (1) is a matrix comprising the current position Rcp(t) of the laser processing head 3 and the current attitude Rcθ(t) of the laser processing head 3.

Mathematical Expressions 1

$$\begin{bmatrix} Sr(t) \\ 1 \end{bmatrix} = \begin{bmatrix} {}^{S}T_{R}(Rc\theta(t)) & Rcp(t) \\ 0 & 1 \end{bmatrix} \begin{bmatrix} Wr(t) \\ 1 \end{bmatrix} \quad (1)$$

$$Rc(t) = \begin{bmatrix} Rcp(t) \\ Rc\theta(t) \end{bmatrix} \quad (2)$$

By revising the entire coordinate system in this way, even if the actual current position of the robot 1 is offset from the commanded movement position, the laser beam emitted from the reflecting mirror 11 can be instantly adjusted such that it strikes the predetermined irradiation position because the current position of the laser processing head 3 is known based on the current position of the robot 1.

The coordinate conversion described here is only one example of a method of calculating the laser emission direction based on the current position of the robot 1. Needless to say, it is acceptable to use any other calculation method that accomplishes the task of determining the direction in which the laser beam should be emitted.

Figure 6:
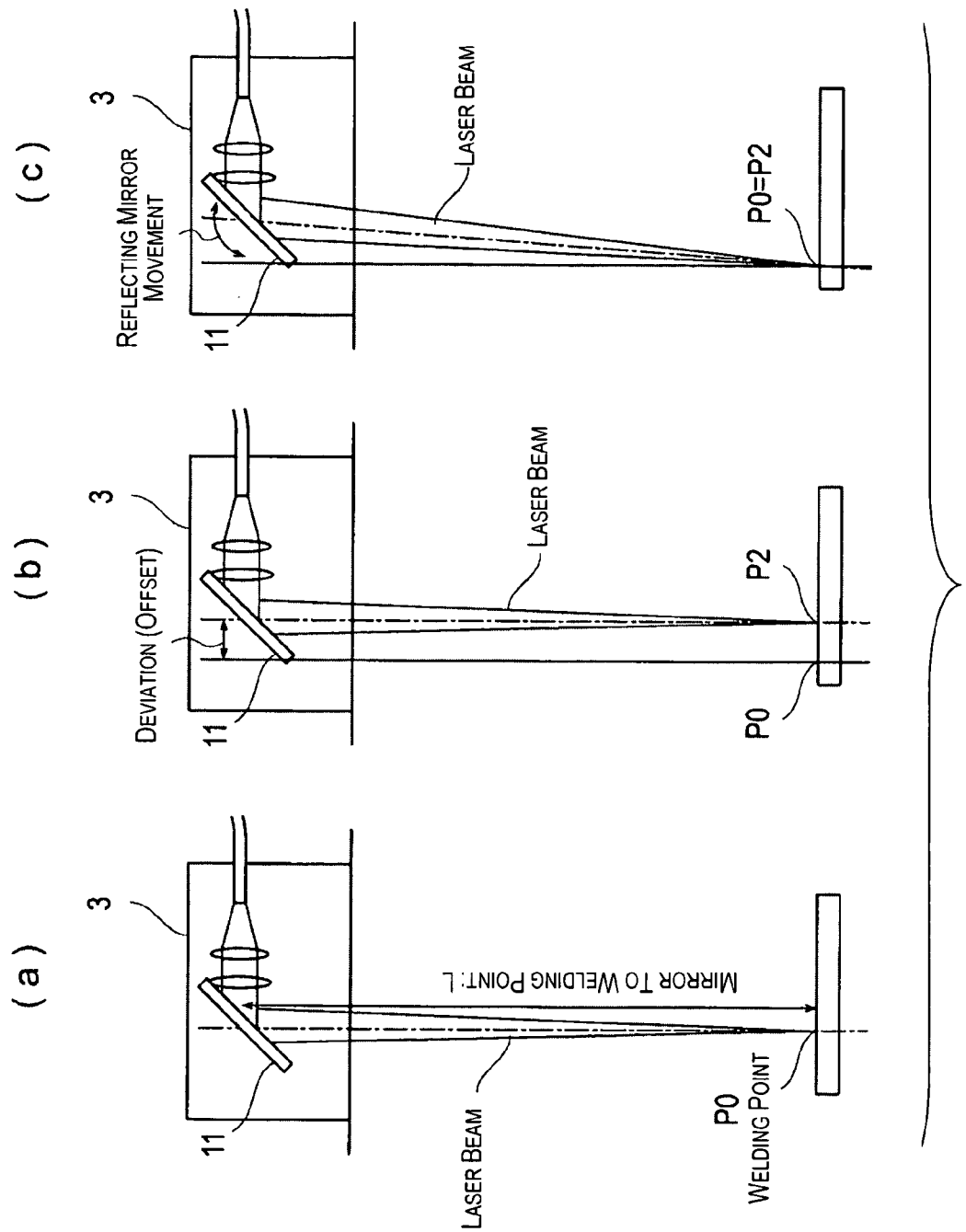
FIG. 6 is a series of schematic views of the laser processing head with respect to a scheduled welding position illustrating a case in which the actual current position of the laser processing head matches with an intended position (diagram (a)), a case in which the actual current position of the laser processing head is offset from the intended position (diagram (b)), and a case in which a revision is made when the actual current position of the laser processing head is offset from the intended position (diagram (c)) in the laser welding system in accordance with the first embodiment of the present invention.

FIG. 6 is a series of schematic views of the laser processing head 3 with respect to a predetermined laser irradiation position P0 illustrating a case in which the actual current position of the laser processing head 3 matches with an intended position (diagram (a)), a case in which the actual current position of the laser processing head 3 is offset from the intended position (diagram (b)), and a case in which a revision is made when the actual current position of the laser processing head 3 is offset from the intended position (diagram (c)) in the laser welding system in accordance with the first embodiment of the present invention.

This kind of deviation (inaccuracy) of the position of the robot 1 occurs when, for example, the actual movement of the robot 1 cannot comply with the movement commands sent to the robot 1.

The diagram (a) of FIG. 6 shows an ideal case in which the robot 1 moves in perfect compliance with the specifications. If the robot 1 moves to the ideal robot position (the commanded movement position), the laser processing head 3 will be at the specified position and the emission direction of the laser beam 100 can be determined based on the specified position without revision to emit the laser beam onto the predetermined laser irradiation position P0.

However, in actual operation, the position of the laser processing head 3 could be slightly offset from the specified position as shown in the diagram (b) of FIG. 6 due to the inertia and ease of movement of the robot 1. If the laser beam emission direction is determined based on the commanded movement position obtained from the robot teaching data and the laser is emitted from the laser processing head 3 disposed in this offset position, the laser beam will strike the workpiece at a position P2 that is offset from the predetermined laser irradiation position P0.

In the first embodiment, the current position of the laser processing head 3 is calculated based on values obtained from the encoders coupled to the axes 21 to 26 of the robot 1. Thus, the reflecting mirror 11 is moved such that the laser beam 100 is directed toward the predetermined laser irradiation position P0 from the actual current position of the laser processing head 3 in real time. As a result, the laser beam emission direction is controlled such that the laser beam 100 accurately strikes the predetermined laser irradiation position P0 as shown in the diagram (c) of FIG. 6.

In the first embodiment, as previously described, the entire coordinate system of the laser processing head 3 is converted based on the current position of the laser processing head 3 (here, the term "position" includes the angle of the laser processing head 3) as determined based on the values obtained from the encoders of the robot axes. In this way, the inaccuracy of the position of the robot 1 is compensated for and the laser beam 100 is directed to the predetermined laser irradiation position.

By converting the coordinates using the matrix equation described previously, both the change in the position and the change in the focal distance can be taken into account so as to accurately align the laser beam 100 with the predetermined laser irradiation position. Also, the amount by which the distance from the current position to the welding point has changed with respect to the original focal distance position specified in the teaching data can be known based on the difference between the coordinate system $\Sigma S(t)$ of the laser processing head 3 corresponding to the command value sent to the robot 1 and the coordinate system $\Sigma S'(t)$ of the laser processing head 3 corresponding to the current position of the laser processing head 3. Therefore, when the laser beam adjustment is not calculated by converting the coordinates using the matrix equation as described above, the focal distance can be adjusted by calculating the focal distance in such a manner as to take into account the amount by which the focal distance has changed. In such a case, the lens movement command value $SL(t)$ for adjusting the focal distance is sent as a command to the laser processing head 3 and the focusing lens 122 is moved in accordance with the command to adjust the focal distance.

The overall flow of control steps involved in welding a workpiece using the laser welding system in accordance with the first embodiment will now be explained.

Figure 7:
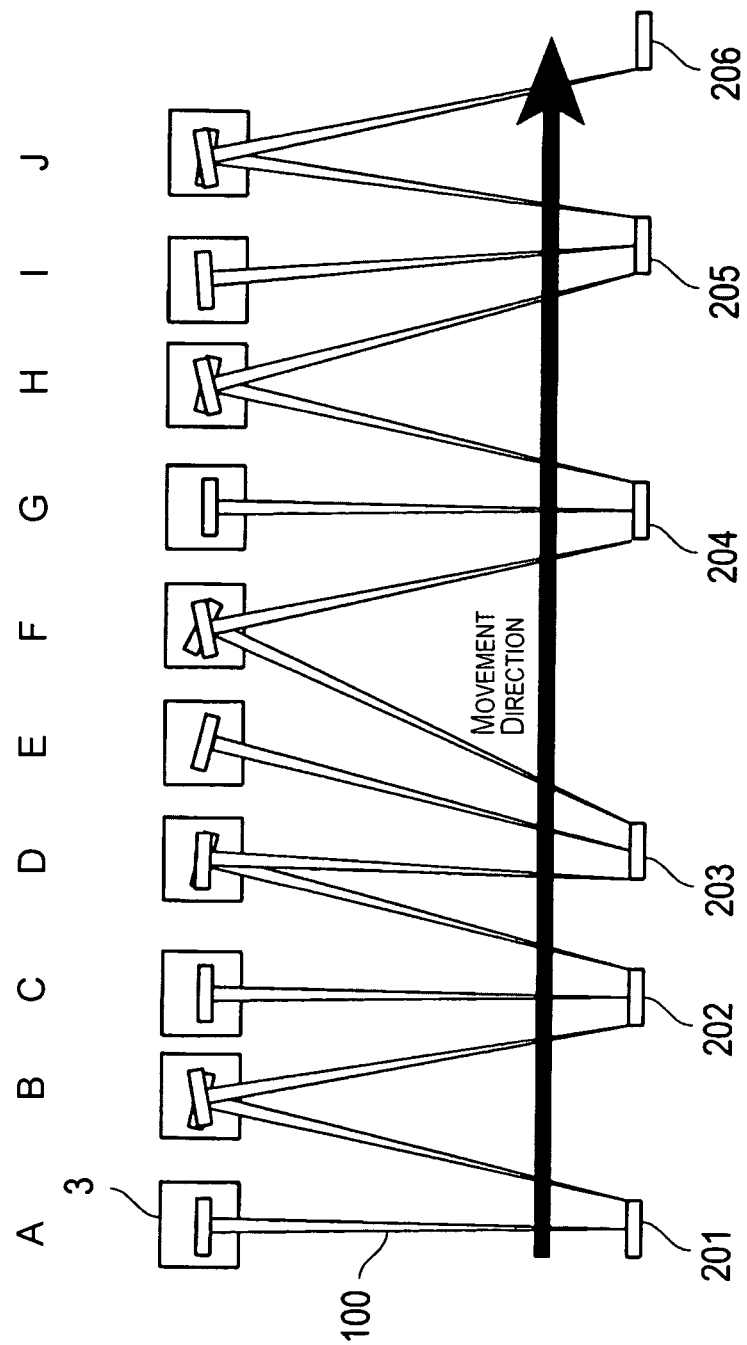
FIG. 7 is a schematic view illustrating a movement of the laser processing head of the laser welding system with respect to a plurality of welding points on a workpiece during a laser welding operation in the laser welding system in accordance with the first embodiment of the present invention.

FIG. 7 is a diagram for explaining the movement of the laser processing head 3 during laser welding. In FIG. 7, a simplified example is illustrated to facilitate ease of understanding.

In the first embodiment, when there are multiple welding points 201 to 206 as shown in FIG. 7, the laser processing head 3 is moved at a prescribed speed from one welding point (e.g., point 201) toward the next welding point (e.g., point 202) even while the laser beam 100 is being emitted toward the currently targeted welding point (e.g., point 201). While the laser processing head 3 is moving, the reflecting mirror 11 is simultaneously turned in accordance with a control signal (command) from the processing head control unit 53 such that the laser beam 100 does not deviate from the current welding point (e.g., point 201) until the welding of the current welding point (e.g., point 201) has been completed. As previously mentioned, the direction of the reflecting mirror 11 is revised, i.e., the reflecting mirror 11 is turned, in accordance with the current position of the laser processing head 3 in real time such that the laser emission direction is continuously adjusted toward the predetermined laser irradiation position and the laser beam 100 reliably strikes the intended welding point.

Thus, in the example shown in FIG. 7, while the laser processing head 3 moves from position A to position J at a constant speed, the reflecting mirror 11 is turned such that the laser emission direction is aimed toward respective one of the welding points 201 to 206. It is also acceptable for the movement speed of the laser processing head 3 to vary instead of being constant.

The position of the laser processing head 3 is moved by changing the posture of the robot 1, i.e., by moving the robot arm 2. The movement of the robot 1 is controlled by the robot control unit 52 and is contrived such that the position of the laser processing head 3 is moved at a constant speed from the current welding point toward the next welding point. Thus, in FIG. 7, the laser processing head 3 is moved at a constant speed from the position A to the position J.

In accordance with the laser irradiation position control, the reflecting mirror 11 is controlled such that the laser beam 100 remains focused on each particular welding point while that welding point is being welded. As a result, a weld bead can be formed accurately even while the laser processing head 3 is moving.

The movement speed of the laser processing head 3 needs to be faster than the welding speed so that the laser beam 100 can reach the next welding point (e.g., point 202) immediately after the welding of the current welding point (e.g., point 201) is completed.

Welding speeds for laser welding typically range from 1 to 5 m/min. On the other hand, the maximum movement speeds of the laser processing head 3 (i.e., the speed at which the robot arm 2 is moved) range from, for example, 10 to 20 m/min, although the maximum speed varies depending on the robot 1. Also, the focal point of the laser beam 100 emitted from the reflecting mirror 11 can be moved at a maximum speed of approximately 100 m/min when the focal point is located approximately 1 m from the reflecting mirror 11. Thus, it is quite feasible to make the movement speed of the laser processing head 3 faster than the welding speed.

It is preferable to set the welding speed, the movement speeds of the laser processing head 3, and the movement speed of the focal point by the reflecting mirror 11 so that the vibration of the laser processing head 3 is suppressed. Therefore, it is preferable to select each of the speeds such that the movement speed of the laser processing head 3 is as low as possible.

The movement of the laser focal point of the laser beam 100 to the next welding point (e.g., point 202) after the current welding point (e.g., point 201) is completed by turning the reflecting mirror 11. When moving the laser beam 100 to the next welding point, the reflecting mirror 11 is preferably turned at as fast a speed as possible. It is acceptable if the laser output is not stopped, i.e., for the laser output to remain on, during this movement of the mirror 11. The laser output does not need to be stopped because the laser beam is out of focus with respect to the workpiece during much of the movement and because the laser focal point is moved at a speed that is an order of magnitude larger than the welding speed. Thus, even if the laser beam 100 strikes a portion of the workpiece that is not supposed to be welded during the movement from one welding point to the next, that portion is not damaged and is hardly even affected because the laser beam 100 is either out of focus or moving so fast that (even if it is in focus) it only strikes the workpiece for a short moment. If necessary, it is also possible to issue an off signal or a signal for lowering the output intensity to the laser controller 51 so as to temporarily stop the laser output or lower the intensity of the laser output when the laser beam 100 is moved from one welding point to another.

When the movement of the laser processing head 3 by the robot 1 and the direction of the reflecting mirror 11are controlled as just described, the welding of a given welding point (e.g., point 202) starts before the laser processing head 3 provided on the tip end of the robot arm 2 has reached the welding point (e.g., point 202) (e.g., the welding starts when the laser processing head 3 is at the position B in FIG. 7). The welding of the same welding point (e.g., point 202) ends when the laser processing head 3 has passed beyond the welding point (e.g., point 202) (e.g., the welding ends when the head is at the position D in FIG. 7).

Figure 8:
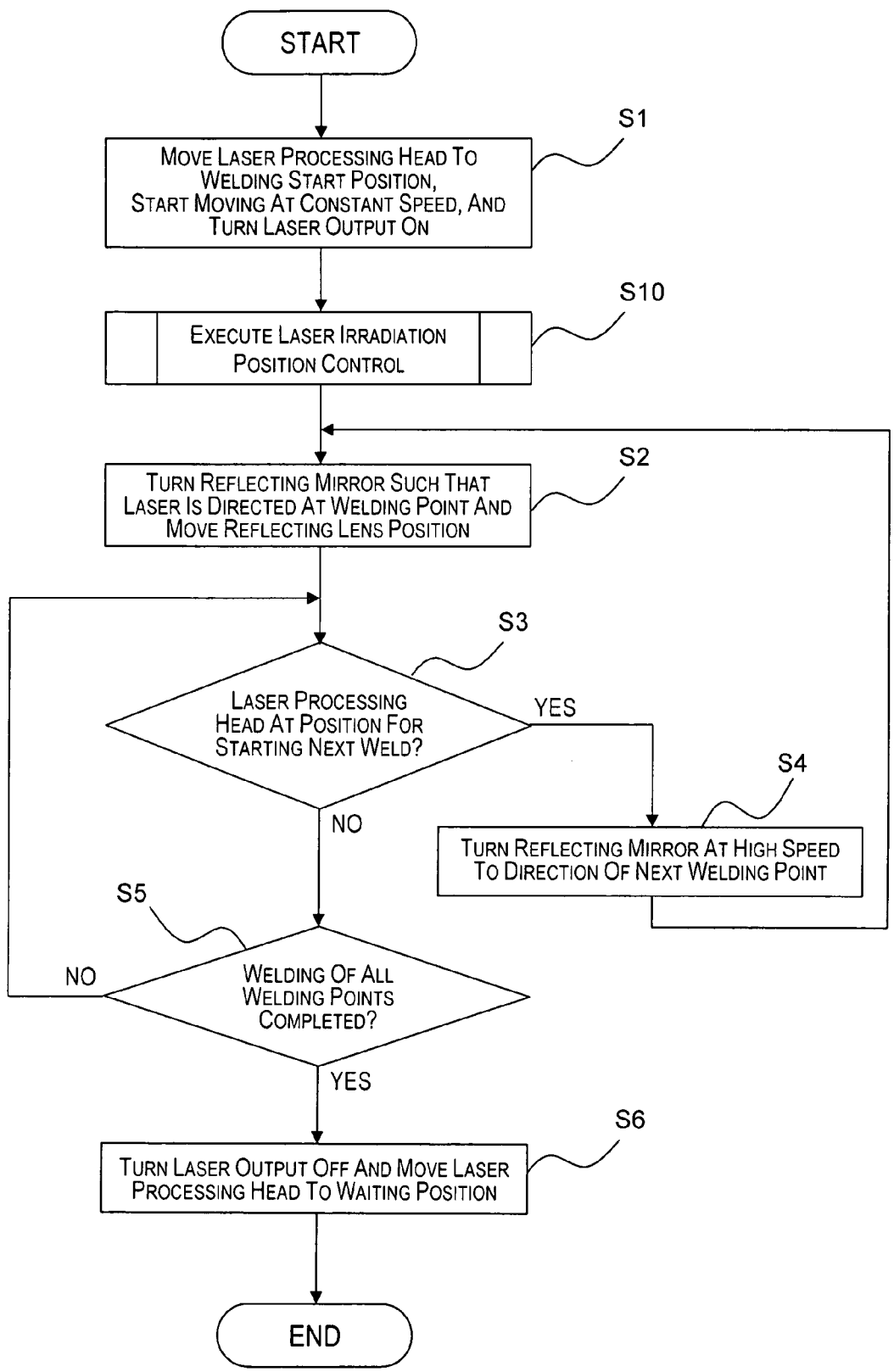
FIG. 8 is a flowchart illustrating a control process for the overall laser welding control procedure executed in the laser welding system in accordance with the first embodiment of the present invention.

FIG. 8 is a flowchart showing the control steps executed during the remote welding in the laser welding system in accordance with the first embodiment of the present invention.

First, in step S1, the robot control unit 52 is configured to move the laser processing head 3 to the first welding start position in accordance with the teaching data (that was created and stored in advance by running the robot 1 through a teaching procedure) and to start moving the laser processing head 3 at a constant speed. At the same time, the robot control unit 52 is configured to send a command to the laser controller 51instructing it to turn the laser output on. Also, simultaneously with step S1, in step S10, the robot control unit 52 is configured to execute the laser irradiation position control explained previously with reference to the flowchart of FIG. 5. In step S2, the robot control unit 52 is configured to output the laser emission command value Sr(t) to the processing head control unit 53 for moving the reflecting mirror 11 and the focusing lens 122 by the commanded movement amounts. As a result, the reflecting mirror 11 and the focusing lens 122 move to the commanded positions.

Then, in step S3, the robot control unit 52 is configured to determine if the laser processing head 3 has reached the welding start position of the next welding point in accordance with the teaching data. In the first embodiment, the teaching data is set such that the welding start position of the next welding point is the same as the position where welding of the previous welding point ends.

If the laser processing head 3 has reached the welding start position of the next welding point, in step S4, the robot control unit 52 is configured to issue a command to the processing head control unit 53 instructing it to turn the reflecting mirror 11 at a high speed to such a position that the reflecting mirror 11 is oriented toward the next welding point. In response to the command, the processing head control unit 53 is configured to turn the reflective mirror 11at a high speed to the direction of the next targeted welding point such that the laser beam 100 is emitted toward the next welding point. Steps S2 to S4 are repeated until the welding of the final welding point is completed. The laser irradiation position control continues during the period when these steps are being executed.

Meanwhile, if, in step S3, the laser processing head 3 has not reached the welding start position of the next welding point, the robot control unit 52 is configured to determine if welding of all of the welding points has been completed in step S5. This determination is accomplished by determining if welding of the final welding point has been completed based on the teaching data. If the welding of the final welding point has not been completed, the robot control unit 52 is configured to return to step S3 because the welding of the current welding point is not finished. Thus, the system continues welding the current welding point without interruption.

If the welding of the final welding point is determined to be finished in step S5, the robot control unit 52 is configured to instruct the laser controller 51to turn the laser output off, and to return the laser processing head 3 to a waiting position (or a home position to which the laser processing head 3 is returned when the welding work is finished) in step S6. Then the robot control unit 52 ends all operations.

The operation of the welding system illustrated in the flowchart of FIG. 8 will now be explained with reference to the example shown in FIG. 7. First, the robot control unit 52 is configured to move the laser processing head 3 to the welding start position A of the welding point 201 and to start the laser output while moving the laser processing head 3 at a prescribed speed. Simultaneously, the robot control unit 52 is configured to turn the reflecting mirror 11 such that the laser beam 100 is directed onto the welding point 201. In order to direct the laser beam 100 to the welding point 201, the robot control unit 52 continuously revises the reflecting mirror position specified by the teaching data in accordance with the laser irradiation position control as illustrated in the flowchart of FIG. 5.

The laser processing head 3 passes by the position B and reaches the welding start position C of the welding point 202. When the laser processing head 3 reaches the position C (at this point in time, welding of the welding point 201 is finished), the robot control unit 52 is configured to turn the reflecting mirror 11 at the maximum speed specified in the teaching data until the laser emission direction is aimed at the welding point 202. Robot control unit 52 is then configured to continue on to execute welding of the welding point 202. The same processing steps are repeated until welding of the welding point 206 is finished. When welding of the welding point 206 is completed, the laser output is stopped and all welding operations are ended.

With the first embodiment, the current position of the laser processing head 3 is calculated in real time based on the current position of the robot 1obtained from the encoders of the robot axes 21 to 26 and the direction of the reflecting mirror 11 is changed such that the laser beam is aimed in the direction of the targeted welding point, i.e., the predetermined laser irradiation position. Thus, even if the actual position of the robot 1 deviates from the movement command position due to inertia of the robot 1 or other factors, the laser beam 100 can be accurately directed onto the welding points by moving the reflecting mirror 11 at a speed that is much higher than the movement speed of the robot 1. As a result, laser welding can be conducted in such a manner that the laser beam does not deviate from the laser irradiation position of the portion being welded and the welding quality is improved.

Additionally, since the first embodiment is configured to compensate for deviation of the focal distance, deviation of the position of the laser processing head 3 can be compensated for by changing the angle of the reflecting mirror 11 and, if the revision of the angle of the reflecting mirror 11 causes a path length of the laser beam (a length between the reflecting mirror 11 and the welding point) to deviate from the value specified in the teaching data, the focal distance can be adjusted precisely such that welding can be executed.

Second Embodiment

Figure 9:
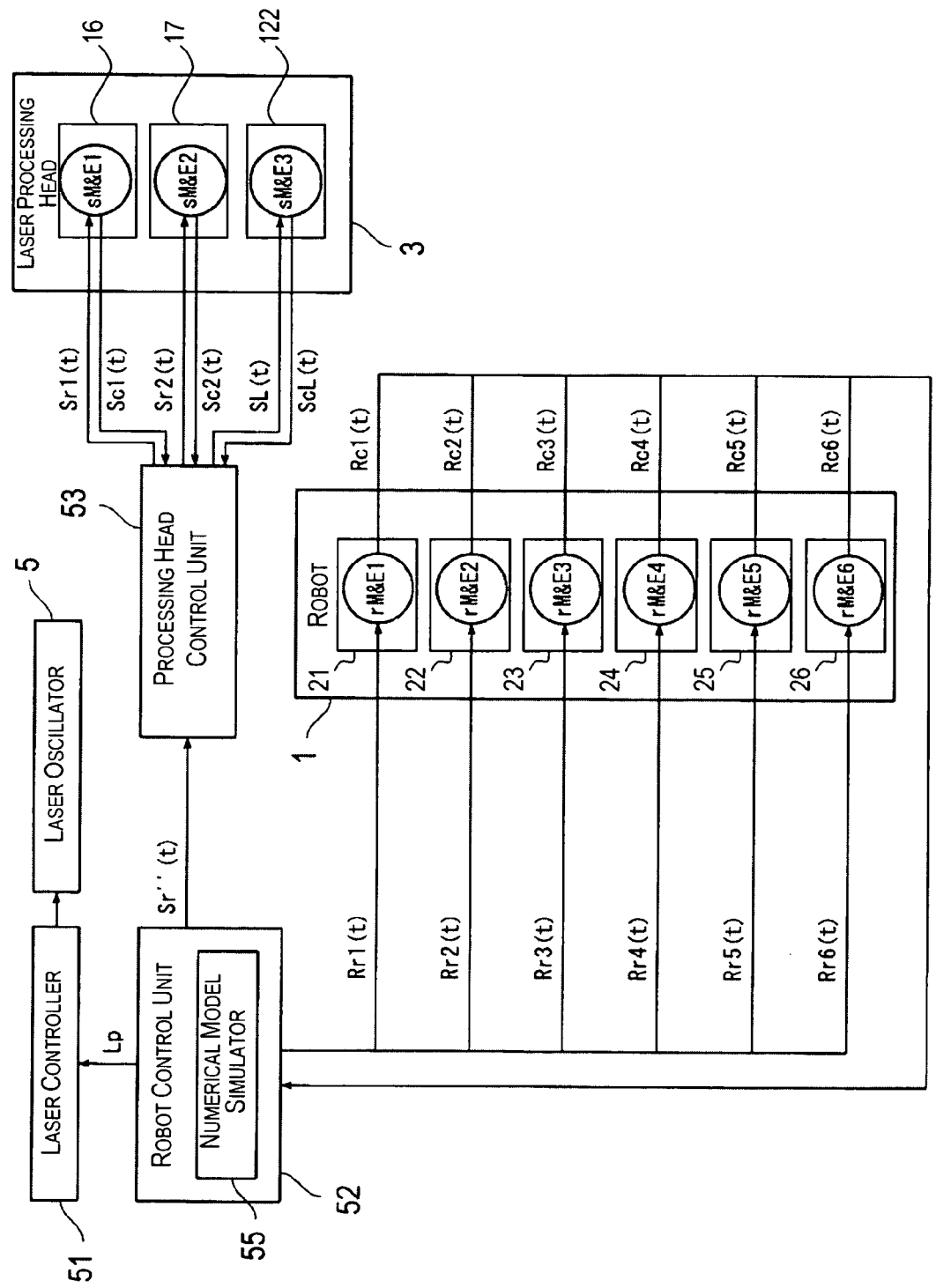
FIG. 9 is a block diagram for explaining a welding operation control executed in a laser welding system in accordance with a second embodiment of the present invention.

Referring now to FIG. 9, a laser welding system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 9 is a block diagram for explaining a welding operation control executed in the laser welding system in accordance with a second embodiment of the present invention. The structures of the laser welding system in accordance with the second embodiment is identical to the structures of the laser welding system of the first embodiment illustrated in FIGS. 1 to 3. The laser welding system of the second embodiment differs from the laser welding system of the first embodiment in that a numerical model simulator 55 (estimating section) is provided in the robot control unit 52 in the second embodiment as seen in FIG. 9. The numerical model simulator 55 is configured to simulate the operation (movement) of the robot 1 controlled by the robot control unit 52 using a numerical model and to determine a position of the laser processing head 3.

The numerical model simulator 55 is configured to use movement positions of the robot 1 specified in the teaching data of the robot 1 and to execute an imaginary (virtual) calculation of the actual position (including the posture) of the robot 1 with respect to time t. The virtual current positions that are close to the actual positions of the robot 1 can be obtained by taking into account such characteristics as the inertia and ease of movement of the robot 1.

Based on the virtual position of the robot 1, the numerical model simulator 55 is also configured to find a virtual laser emission command value for emitting the laser beam from the laser processing head 3 toward the target welding point.

Thus, virtual movement amounts of the reflecting mirror 11 and the focusing lens 122 in a virtual coordinate system of the laser processing head 3 are found with respect to the virtual position of the robot 1 by means of a simulation.

The robot control unit 52 is then further configured to revise the virtual laser emission command value based on the actual current position of the robot 1 obtained from the encoders coupled to the axes 21 to 26 of the robot 1 and to calculate a laser emission command value Sr''(t) for actually moving the reflecting mirror 11 and the focusing lens 122.

The simulation-based revision operation of the laser welding system in the second embodiment, i.e., the calculation of the laser emission command value Sr''(t) for actually moving the reflecting mirror 11 and the focusing lens 122, is accomplished using a matrix equation in the same manner as in the first embodiment.

First, the virtual laser emission command value S'r(t) in the virtual laser head coordinate system Σ'S(t) is found based on the virtual position of the robot 1 using the equation (3) below. The equation (3) uses the difference ΔR'(t) between the command position and the simulation value. As shown in the equation (4) below, the difference ΔR'(t) is a matrix comprising the difference ΔR'p(t) between the position of the laser processing head 3 specified by the robot command and the position of the laser processing head 3 calculated by the simulation, and the difference ΔR'θ(t) between the attitude (angle) of the laser processing head 3 specified by the command and the angle of the laser processing head 3 calculated by the simulation. In the equation (3), the value Sr(t) is a laser emission command value corresponding to the robot command position, and $^{S'}T_S(\Delta R'\theta(t))$ is a rotation matrix determined based on the difference between the command value of the angle of the laser processing head 3 and the angle obtained by means of the simulation.

Mathematical Expressions 2

$$\begin{bmatrix} S'r(t) \\ 1 \end{bmatrix} = \begin{bmatrix} {}^{S'}T_S(\Delta R'\theta(t)) & \Delta R'p(t) \\ 0 & 1 \end{bmatrix} \begin{bmatrix} Sr(t) \\ 1 \end{bmatrix} \quad (3)$$

$$\Delta R'(t) = \begin{bmatrix} \Delta R'p(t) \\ \Delta R'\theta(t) \end{bmatrix} \quad (4)$$

Next, using the matrix equation (5) shown below, the laser emission command value S''r(t) indicating the movement amounts that will actually be used to move the reflecting mirror 11 and the focusing lens 122 is calculated based on the virtual position of the laser processing head 3 obtained by the simulation and the actual position of the robot 1 obtained from the encoders.

The equation (5) uses the difference ΔR(t) between the simulation value and the actual position obtained from the encoders. As shown in the equation (6), the difference ΔR(t) is a matrix comprising the difference ΔRp(t) between the position of the laser processing head 3 calculated by the simulation and the actual position obtained from the encoders, and the difference ΔRθ(t) between the angle of the laser processing head 3 calculated by the simulation and the angle obtained from the encoders. Also, $^{S''}T_{S'}T_S(\Delta R\theta(t))$ is a rotation matrix determined based on the difference between the angle of the laser processing head 3 obtained by the simulation and the current angle obtained with the encoders.

Mathematical Expressions 3

$$\begin{bmatrix} S''r(t) \\ 1 \end{bmatrix} = \begin{bmatrix} {}^{S''}T_{S'}(\Delta R\theta(t)) & \Delta Rp(t) \\ 0 & 1 \end{bmatrix} \begin{bmatrix} S'r(t) \\ 1 \end{bmatrix} \quad (5)$$

$$\Delta R(t) = \begin{bmatrix} \Delta Rp(t) \\ \Delta R\theta(t) \end{bmatrix} \quad (6)$$

In the second embodiment, the position of the robot is estimated to some degree using a simulation and the virtual laser emission command value is calculated with respect to the estimated position. Then, the actual current position of the laser processing head 3 obtained with the encoders is used to revise the virtual laser emission command value so as to obtain the laser emission command value Sr''(t) that will actually be used to aim the laser beam. As a result, the revision amount is smaller than a case in which the command position of the robot 1 is compared directly to the actual current position and the control time is shortened since only a small amount of revision is necessary. Consequently, in the second embodiment, the laser beam can be more accurately aimed so as to strike the predetermined laser irradiation position.

With the second embodiment, since the numerical model simulator 55 is provided inside the robot control unit 52 of the robot 1 (in other words, the robot control unit 22 is configured to perform the numerical model simulation), the simulation that takes into account the characteristics of the particular robot 1 can be executed in the robot control unit 52 used to control that particular robot 1. Therefore, when a plurality of robots 1 are used, simulations that take into account the respective characteristics of the individual robots 1 can be executed by inputting the characteristics of each particular robot 1 into the simulator of the respective robot control unit 52.

Alternatively, it is acceptable for the numerical model simulator 55 to be arranged as an external device of the robot control unit 52. In such a case, the result of the simulation, i.e., virtual laser emission command value based on the estimated position of the laser processing head 3 obtained based on the teaching data, can be simply delivered to the robot control unit 52.

In a case in which the numerical model simulator 55 is arranged as an external device of the robot control unit 52, if it is difficult to take into account the particular characteristics of each individual robot 1, the position of the laser processing head 3 can simply be estimated based on the teaching data obtained at the robot operation (movement) design stage. Then, the virtual laser emission command value can be simulated based on the estimated position.

Third Embodiment

Figure 10:
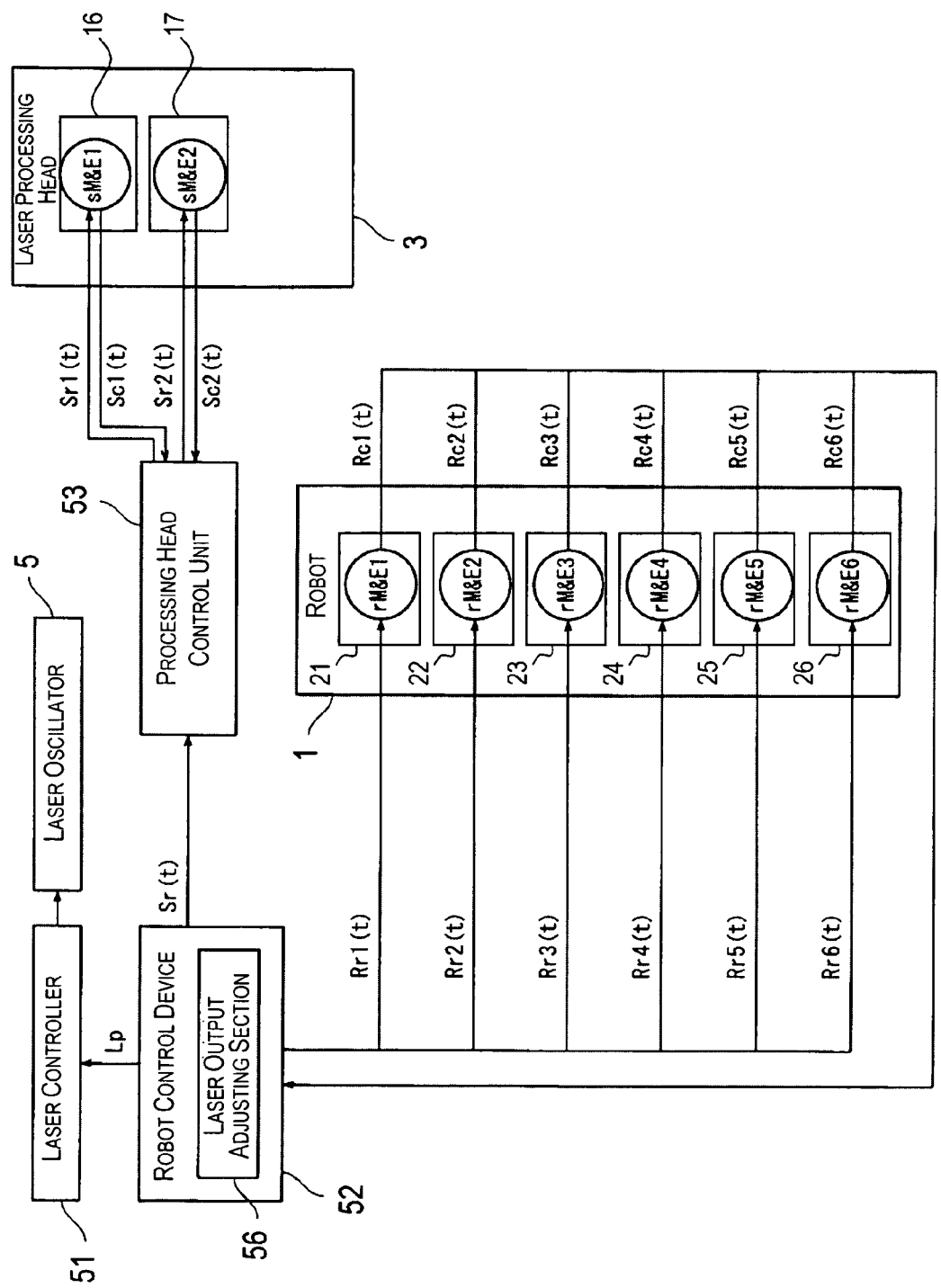
FIG. 10 is a block diagram for explaining a welding operation control executed in a laser welding system in accordance with a third embodiment of the present invention.
Figure 11:
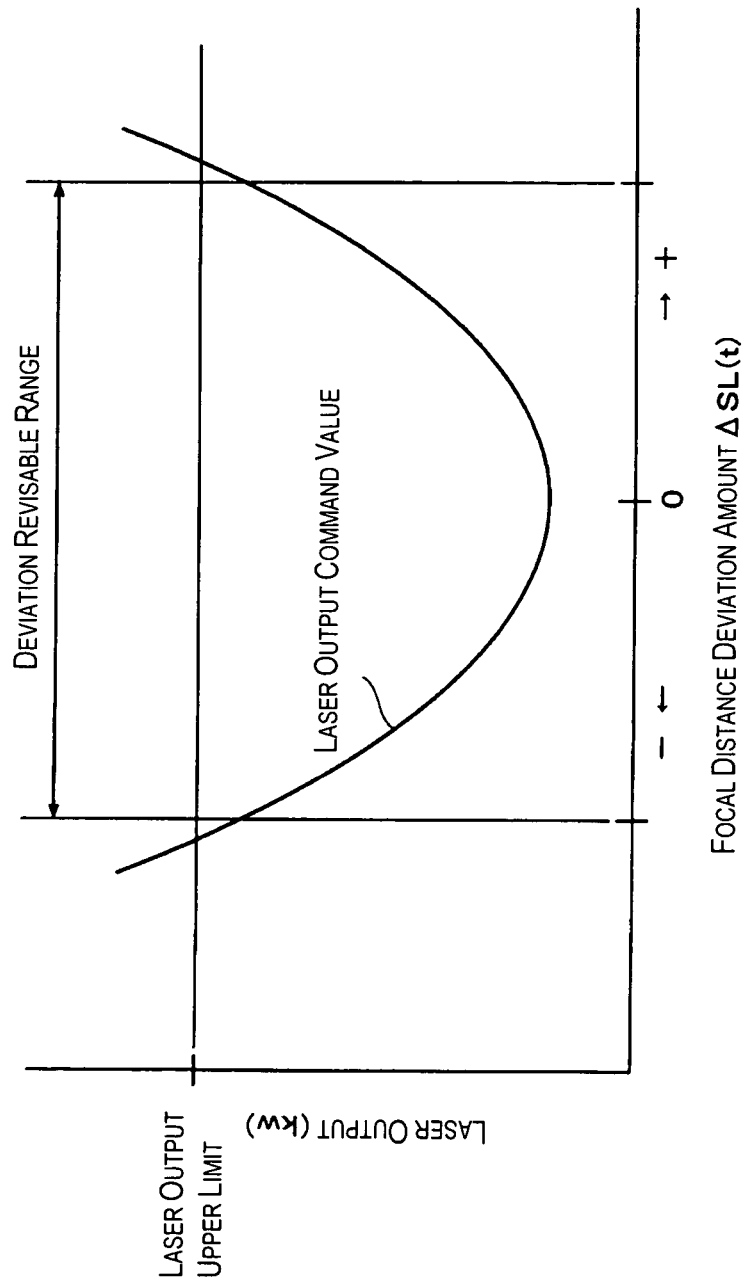
FIG. 11 is a graph showing the relationship between the laser output and the focal distance deviation amount in the laser welding system in accordance with the third embodiment of the present invention.

Referring now to FIGS. 10 and 11, a laser welding system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

FIG. 10 is a block diagram for explaining a welding operation control executed in a laser welding system in accordance with a third embodiment of the present invention. The laser welding system of the third embodiment differs from the laser welding system of the first embodiment in that a laser output adjusting section 56 is provided in the robot control unit 52 in the third embodiment as shown in FIG. 10. The laser output adjusting section 56 is configured to obtain a revised focal distance from the calculated revised laser emission command value (i.e., Sr(t) in the first embodiment and S"r(t) in the second embodiment) and to compare the revised focal distance to the focal distance specified in the original teaching data. FIG. 10 illustrates a case in which the revised laser emission control value Sr(t) is calculated in the same manner as in the first embodiment. If the path length of the laser beam differs from the value specified in the teaching data, the laser output adjusting section 56 is configured to adjust the laser output in accordance with the magnitude of the difference. In response to a command from the laser output adjusting section 56, the robot control unit 52 is configured to send a control signal Lp to the laser controller 51. The laser controller 51 is configured to control the output of the laser oscillator 5 in accordance with the control signal Lp.

The laser output adjusting section 56 is configured to obtain the original laser beam path length, i.e., the original focal length, from the teaching data. The laser output adjusting section 56 is also configured to obtain the revised focal distance from the laser emission command value Sr(t) calculated using the revision method of the first embodiment or the second embodiment. Thus, in the third embodiment, a lens movement command value SL(t) is not outputted from the processing head control unit 53.

When the laser welding system is not provided with a focal distance adjusting function (e.g., the welding system is not provided with the movable focusing lens 122), the focal distance is fixed and this fixed focal distance (distance from the reflecting mirror 11 to the welding point) is used as the teaching data. FIG. 10 shows a case in which a focal distance adjusting function is not provided.

Otherwise, the structures of the laser welding system in accordance with the third embodiment is identical to the structures of the laser welding system of the first embodiment illustrated in FIGS. 1 to 3. Also, the operation of the third embodiment is basically the same as the operation of the first and second embodiments, except for the laser power adjustment. Thus, the descriptions of the parts and the operations of the third embodiment that are identical to the parts and operations of the first or second embodiment are omitted for the sake of brevity FIG. 11 is a graph showing the relationship between the laser output and the focal distance deviation amount in the laser welding system in accordance with the third embodiment of the present invention.

The laser strength (intensity) is highest at the narrowest portion of the laser beam where the laser beam spot is the most focused (smallest in diameter). When the focal distance deviates such that the narrowest portion of the beam is not aligned with the laser irradiation position, the laser intensity at the welding point decreases proportionally to the surface area of the spot.

In the third embodiment, the laser welding system uses graph data like that shown in FIG. 11 to adjust the laser output in accordance with the deviation in focal distance.

In the graph shown in FIG. 11, the amount $\Delta SL(t)$ by which the revised focal distance deviates from the focal distance in the teaching data is indicated on the horizontal axis and the laser output is indicated on the vertical axis.

The laser output command value (corresponding to the control signal Lp) is increased proportionally to the area of the spot at the corresponding focal distance deviation amount. Since there is the possibility that a proper weld cannot be accomplished if the focal distance of the laser beam deviates too much, the laser welding system of the third embodiment is configured such that an error occurs when the deviation amount exceeds a revisable range (e.g., the laser output is stopped and a message indicating that the weld cannot be completed is displayed).

Also, since the laser output cannot be controlled to exceed an upper limit, the graph shown in FIG. 11 indicates the laser output upper limit value. In the example shown in the graph in FIG. 11, the laser output will never exceed the laser output upper limit value because the laser output upper limit value is set beyond the deviation revisable range. However, if the laser welding system were configured such that laser output upper limit value was set within the deviation revisable range, an error would occur whenever the laser output exceeded the laser output upper limit value (e.g., the laser output would be stopped and a message indicating that the weld cannot be completed would be displayed).

With the third embodiment, when the revisions executed in order to aim the laser beam at the predetermined laser irradiation position (welding point) cause the distance from the reflecting mirror 11 to the welding point to deviate from the value specified in the teaching data, the laser welding system is configured and arranged to adjust the laser output to a achieve a laser beam intensity appropriate for welding instead of adjusting the focal distance. As a result, it is not necessary to revise the focal distance by adjusting the position of the lens and a uniform welding quality can be maintained.

Fourth Embodiment

Figure 12:
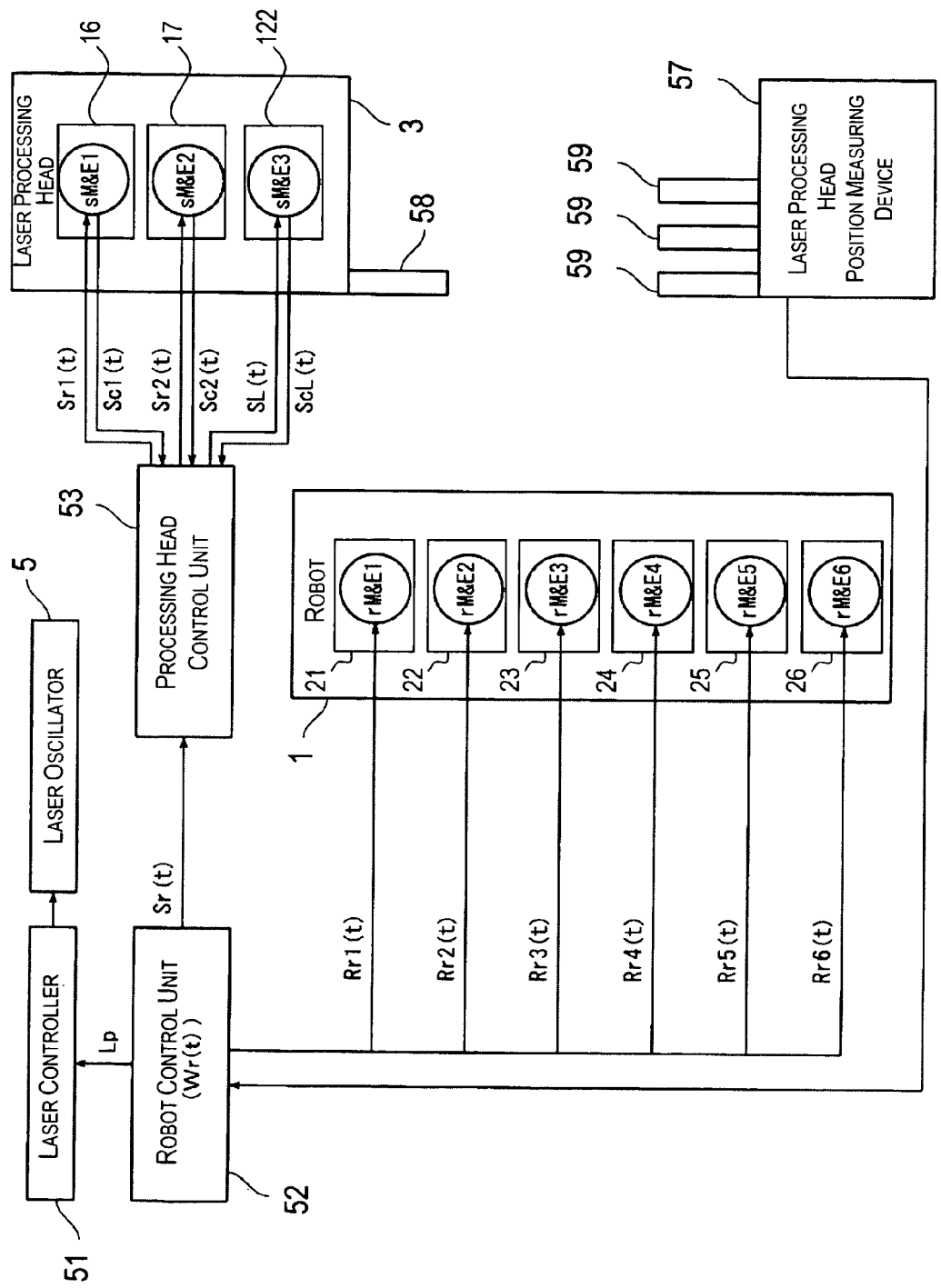
FIG. 12 is a block diagram for explaining a welding operation control executed in a laser welding system in accordance with a fourth embodiment of the present invention.

Referring now to FIG. 12, a laser welding system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 12 is a block diagram for explaining a welding operation control executed in the laser welding system in accordance with the fourth embodiment of the present invention.

The laser welding system of the fourth embodiment differs from the laser welding system of the first embodiment in that the laser welding system of the fourth embodiment includes a position measuring device 57 provided externally to the robot 1. The position measuring device 57 is configured and arranged to measure the position of the laser processing head 3.

Any structures and/or configurations can be used as the position measuring device 57 as long as long as the position measuring device 57 is configured and arranged to ascertain the position of the laser processing head 3 mounted on the robot 1 three-dimensionally in real time. For example, as seen in FIG. 12, the position measuring device 57 includes a radio signal transmitter 58 provided on the laser processing head 3 and at least three receivers 59 configured to receive the radio signal and arranged in different positions around the vicinity of the laser processing head 3. The position measuring device 57 with such arrangements is configured and arranged to calculate the current position of the laser processing head 3 based on the respective transmission times required for the radio signal from the radio signal transmitter 58 to reach each of the receivers 59. Any other device that is capable of measuring the current position of the laser processing head 3 three-dimensionally in real time is also acceptable.

In the fourth embodiment, the values from the encoders provided on the axes of the robot 1 are used solely for checking the operation and are not necessary for the revision processing of the present invention (therefore, the signal lines from the encoders to the robot control unit 52 are omitted in FIG. 12).

When the external position measuring device 57 is used to measure the current position of the laser processing head 3, the revision processing is basically the same as in the first embodiment, except that it is not necessary to calculate the current position of the laser processing head 3 based on the values from the encoders of the robot axes.

In short, the robot control unit 52 is configured to compare the position of the laser processing head 3 found based on the robot movement position specified in the teaching data to the current position of the laser processing head 3 obtained with the position measuring device 57 and to output a laser emission command value Sr(t) that incorporates revisions to compensate for the deviation amount (i.e., the difference between the position based on the teaching data and the measured current position).

Since the fourth embodiment does not require calculating the current position of the laser processing head 3 based on the values from the encoders of the robot axes, at least one step can be eliminated from the revision processing and the operating speed of the processing can be increased.

Although present invention is explained herein based on the first through fourth embodiments in which the invention is applied, the present invention is not limited to these embodiments. For example, although each of the embodiments uses the reflecting mirror 11 to change the direction of the laser beam directed to the laser processing head 3, it is also acceptable to use a prism or other optical device to change the direction of the laser beam.

The present invention is not limited to laser welding and can be applied to other systems and devices in which an emitted entity is emitted. For example, the present invention can be employed in other systems in which an emitting section configured to emit a beam of light (e.g., visible light, infrared light, ultraviolet light, etc.), radiation (e.g., X-rays), electrons, electromagnetic waves, or other emitted entity is mounted to a robot, actuator, or other moving means and the emitting section is configured and arranged to emit a beam while being moved by the moving device. By employing the present invention, the beam of the emitted entity can be emitted so as to accurately strike a scheduled position from the current position of the emitting section. If the beam is a beam of light, a reflecting mirror can be moved to change (adjust) the direction in which the light is emitted. If the beam comprises an emitted entity other than light, the direction in which the beam is emitted can be changed using an electron lens, a deflection coil, or other suitable redirecting devices.

The emitted entity that is emitted from the emitting section is not limited to a light beam. The invention can also be applied when the emitting section emits, for example, shot (i.e., a metal or other solid material), a stream of water, etc.

The present invention can be used in applications in which laser welding is conducted using a robot. However, the invention is not limited to robots. The present invention can be employed in other systems in which an emitting section is mounted to an actuator or other moving device and the emitting section emits an emitted entity while being moved by the moving device.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that-the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A laser welding system comprising:
   a robot configured and arranged to move in accordance with predetermined movement data;
   a laser beam emitting section mounted to the robot and configured and arranged to emit a laser beam, the laser beam emitting section including an emission direction changing section configured and arranged to redirect the laser beam emitted from the laser beam emitting section;
   a measuring section configured and arranged to measure a current movement position of the robot with respect to a movement position specified in the predetermined movement data; and
   a control unit configured to move a movement position of the robot to a prescribed position based on the predetermined movement data, and to control the emission direction changing section to adjust a laser emission direction in which the laser beam is emitted from the laser beam emitting section based on the current movement position of the robot and the predetermined movement data such that the laser beam strikes a predetermined irradiation position.

2. The laser welding system as recited in claim 1, wherein the control unit is further configured to determine a current position of the laser beam emitting section based on the current movement position of the robot, and to adjust the laser emission direction based on the current position of the laser beam emitting section such that the laser beam strikes the predetermined irradiation position.

3. The laser welding system as recited in claim 1, further comprising
   an estimating section configured to estimate a virtual robot movement position using a numerical model of a movement of the robot based on the predetermined movement data, and to obtain an estimated position of the laser beam emitting section with respect to the virtual robot movement position, and
   the control unit being further configured to compare the estimated position of the laser beam emitting section obtained from the estimating section to a current position of the laser beam emitting section obtained based on the current movement position of the robot measured by the measuring section, and to adjust the laser emission direction to compensate for a deviation from the predetermined irradiation position based on a difference between the estimated position and the current position of the laser beam emitting section.

4. The laser welding system as recited in claim 1, wherein
   the measuring section is provided externally with respect to the robot, and configured and arranged to externally measure a current position of the laser beam emitting section, and
   the control unit is configured to adjust the laser emission direction based on the current position of the laser beam emitting section measured by the measuring section such that the laser beam strikes the predetermined irradiation position.

5. The laser welding system as recited in claim 1, wherein
   the laser beam emitting section further includes a focal distance changing section configured and arranged to change a focal distance of the laser beam emitted from the laser beam emitting section, and
   the control unit is further configured to control the focal distance changing section to compensate for a deviation of a revised focal distance calculated based on the current movement position of the robot from a focal distance specified in the predetermined movement data.

6. The laser welding system as recited in claim 1, wherein the control unit is further configured to control output of the laser beam in accordance with a distance from the laser beam emitting section to the predetermined irradiation position.

7. The laser welding system as recited in claim 1, wherein the robot includes an arm; and
   the laser beam emitting section further includes a laser processing head that is mounted to a tip of the arm and further accommodates a reflecting mirror to redirect the laser beam transmitted via an optical fiber cable extending along the arm as controlled by the emission direction changing section in order to compensate for a deviation of the current movement position of the robot from the prescribed position.

* * * * *